Figure 1:
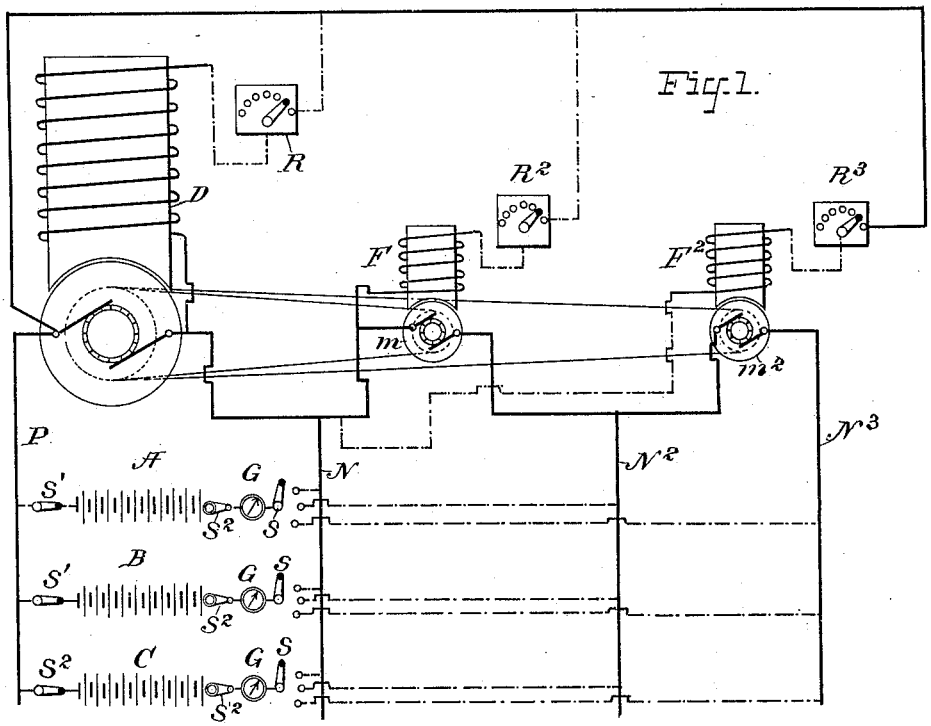

(No Model.) 2 Sheets—Sheet 1.

C. O. MAILLOUX.
APPARATUS FOR CHARGING SECONDARY BATTERIES.

No. 467,547. Patented Jan. 26, 1892.

ATTEST:
J. A. Hurdle
T. F. Courcy

INVENTOR:
Cyprien O. Mailloux
By H. C. Townsend
Attorney

THE NORRIS PETERS CO., PHOTO-LITHO., WASHINGTON, D. C.

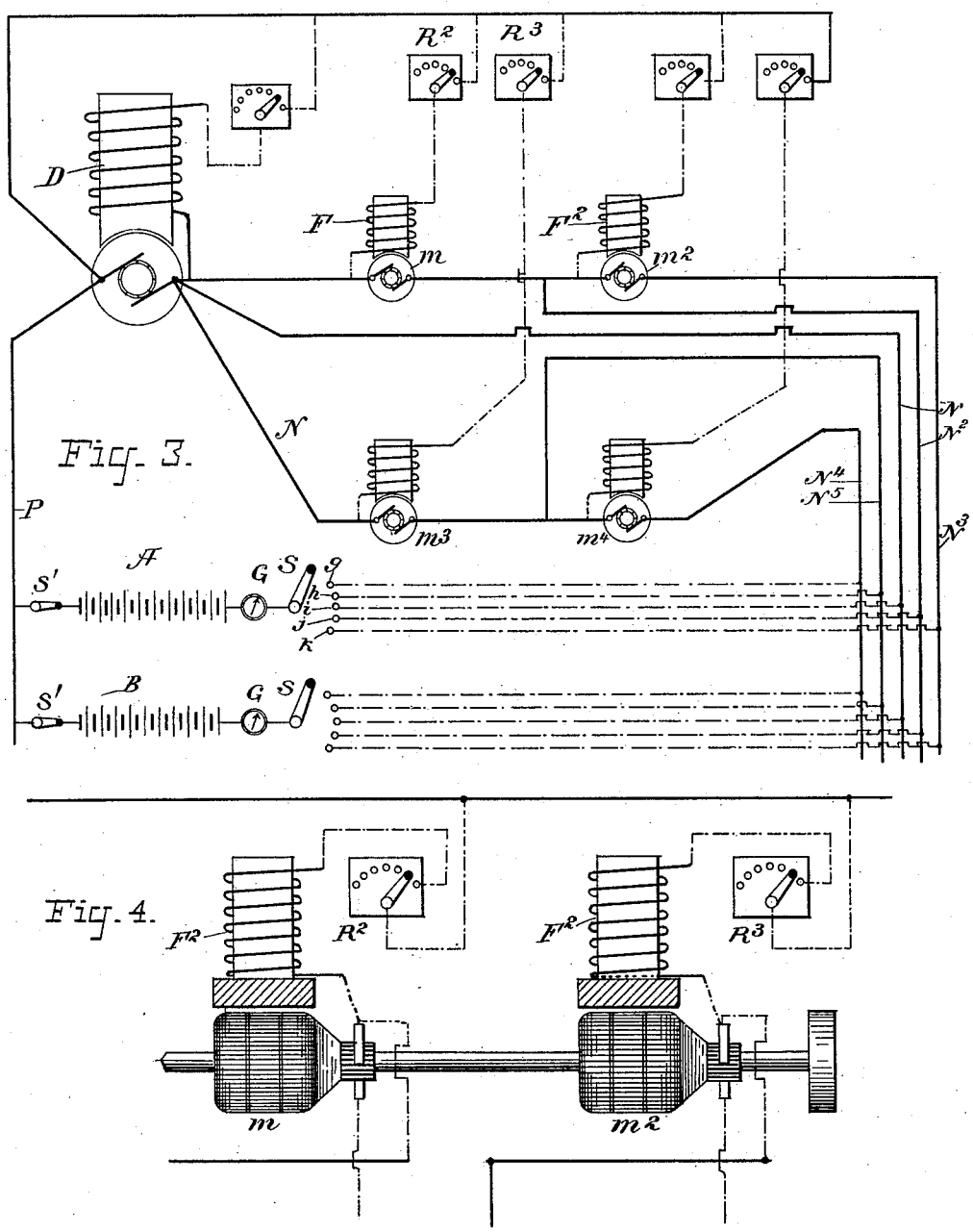

UNITED STATES PATENT OFFICE

CYPRIEN O. MAILLOUX, OF NEW YORK, N. Y.

APPARATUS FOR CHARGING SECONDARY BATTERIES.

SPECIFICATION forming part of Letters Patent No. 467,547, dated January 26, 1892.

Application filed April 24, 1891. Serial No. 390,280. (No model.)

*To all whom it may concern:*

Be it known that I, CYPRIEN O. MAILLOUX, a citizen of the United States, and a resident of New York, in the county of New York and State of New York, have invented certain new and useful Apparatus for Charging Secondary Batteries, of which the following is a specification.

My invention relates to apparatus for charging secondary or storage batteries employed in electric-railway traction or for other purposes, and is especially useful in those cases where the charging has to be done on a large scale and a large number of batteries of the same or different numbers of cells in series require to be charged at or about the same time.

My invention provides a means whereby the charging-current may be regulated or controlled in a reliable manner with certainty and precision and without loss of efficiency.

In the operation of charging storage-batteries it is desirable to make some provision for controlling or adjusting the charging-current, either to accommodate it to batteries having a different number of cells in series or for the purpose either of maintaining a flow of charging-current at a practically constant amount during the whole or the part of the charging period as the counter electro-motive force of the battery rises or to adjust or vary the charging-current at different stages of the operation—as, for instance, to permit the battery to begin charging at a rapid rate and to gradually diminish the rate as the charging is completed. For the purpose of obtaining the control necessary to various stages of the charging operation or to varying number of cells in series it has been the practice heretofore to provide a dead-wire resistance consisting of a conductor opposing a resistance to the flow of the current because of the low specific conductivity of the material composing it, such resistance being put into the circuit between the battery and charging source and adjusted to the particular size of battery or to the particular state of the charging operation and counter electro-motive force of the battery, as desired. In the ordinary way of charging batteries the procedure would be to put in a large amount of this resistance at the beginning of the charging operation, when the counter electro-motice force of the battery is low, and then to cut out the resistance as the charging progresses and the counter electro-motive force of the battery rises, so that the charging-current may be kept up to the proper strength required for the operation of charging either at a constant rate or at a gradually-diminishing rate. It will be obvious that with such a device a great deal of the energy is wasted at the beginning of the operation, since the potential of the charging source must be adjusted to the maximum counter electro-motive force of the battery existing therein toward the close of the charging operation, and at the beginning of the operation the surplus energy of the charging source must be taken up in the resistance. On account of this constant waste of energy caused by the heating effect of the current passing through it, their cumbersomeness, and the complications of circuits and construction required, these resistances are very objectionable.

The object of my invention is to obviate the necessity of using such resistances, and to provide a much simpler and more perfect means for effecting the current regulation or control.

My invention consists, essentially, in the combination, with the main charging-dynamo, of two or more supplemental electro-motive-force generators connected in series therewith and reacting upon the circuit of the battery to be charged, and electric-switch devices having connections to intermediate points of the series, whereby a different number of the supplemental electro-motive-force generators may be included in series with the battery and the main charging source, according to the state of charge of said battery.

My invention consists, also, in the combination, with the main charging source, of a series of supplemental electro-motive-force generators in series therewith and assisting the main charging-current, a second series of supplemental electro-motive-force generators assisting the counter electro-motive force of the battery and connected in series with the main generator, and an electric switch provided with connections to intermediate portions of both series for placing a different number of supplemental generators in the two sets into circuit with the charging-dynamo and battery, according to the state of charge of the latter.

My invention consists, further, in the combination, with a main charging-dynamo and a storage-battery to be charged thereby, of one or more supplemental electro-motive-force generators operated as dynamo-electric machines, and one or more supplemental counter electro-motive-force generators consisting of electro-dynamic motors mechanically connected with said supplemental dynamo-electric generators.

The supplemental or auxiliary electro-motive force employed in my invention is preferably that of the armature of a dynamo or a motor. In the one case the armature would be driven by any suitable prime mover in a magnetic field properly related thereto to cause the electro-motive force of said armature to act to assist that of the main generator. In the other case the armature would be driven as an electric motor by the charging-current of the main generator and in a magnetic field properly related to cause its counter electro-motive force to assist that of the battery. In conjunction with each supplemental armature, operating as an electro-motive-force generator in the manner stated, suitable means may be provided for graduating the electro-motive-force capacity, if desired. By connecting the battery to different points in the series of motor-armatures or dynamo-generator armatures run in series with the main machine the potential forcing the charging-current through the battery may be regulated according to the rise of counter electro-motive force thereof as the charging operation proceeds.

Figure 2:
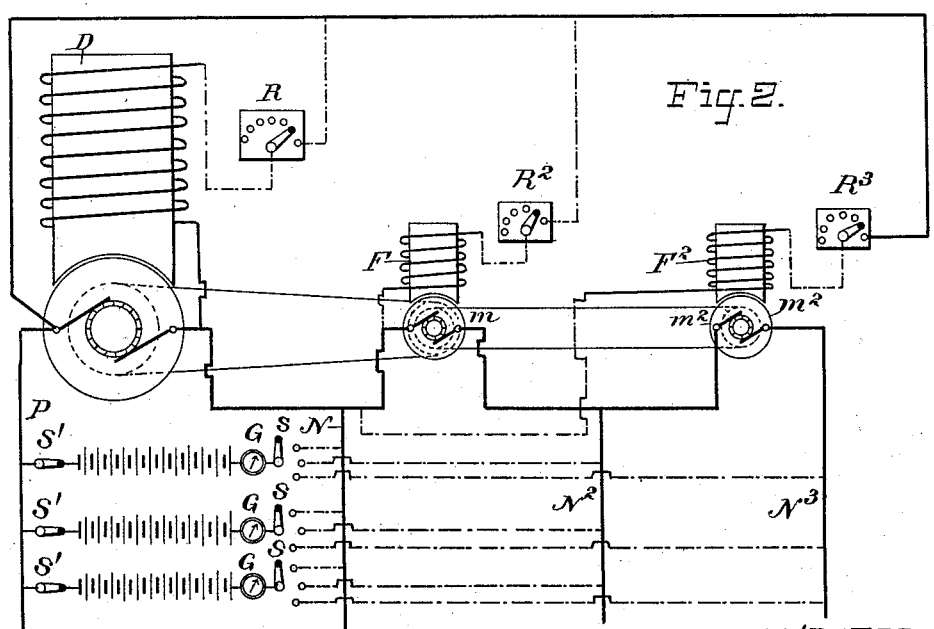

In the accompanying drawings, Figure 1 is a diagram illustrating an organization of apparatus embodying my invention. Fig. 2 is a modification. Fig. 3 illustrates a preferred arrangement. Fig. 4 illustrates the manner in which two supplemental armatures acting one as a motor-armature and the other as a dynamo-generator armature may be run together.

Referring to the drawings, Fig. 1, D indicates any suitable source of charging-current adapted to supply the desired potential to mains or leads P N, across which the battery to be charged may be connected. The machine is preferably constructed to give an approximately constant potential at its terminals, and may have its field excited in shunt or in any other desired manner, as well understood in the art, the degree of exciting-current being controlled by means of a rheostat R or otherwise.

S' S² indicate suitable electric switches or other devices, whereby the batteries A B C, &c., to be charged may be connected into circuit across the charging-mains and with suitable switches S, employed as hereinafter described, to connect a terminal of the battery to different points of the series of machines comprising the main dynamo and the supplemental armatures or electro-motive-force generators.

G G are suitable current-indicators.

$m$ $m^2$ indicate two supplemental electro-motive-force generators, each comprising the usual armature of a dynamo-electric machine or motor, revolving in a suitable field produced by coils F F², which may be traversed by current supplied from the main generator, and may have regulating devices $R^2$ $R^3$ in their circuits for adjusting the strengths of the magnetic fields and the electro-motive force capacity of the armatures $m$ $m^2$. The generators $m$ $m^2$ are connected into series with the generator D, and from the terminal of the series at intermediate points of the series of machines extend the leads $N^3$, $N^2$, and N. If the machines $m$ $m^2$ are run as electro-motive-force generators from any suitable prime mover, so as to assist that of the generator D, it is obvious that the difference of potential available across the mains P $N^3$ will be equal to the sum of the motive force of the generator D, plus that of the two supplemental armatures $m$ $m^2$, while that available across the mains P $N^2$ will be equal to that of D and $m$ alone, or, in other words, the maximum potential or electro-motive force less that of $m^2$. It is obvious that the system might be extended to include other supplemental machines in series with the machines $m$ $m^2$.

Each switch S is provided with suitable contacts and connections whereby the battery in the branch with it may be connected to either lead N $N^2$ $N^3$.

If the armatures $m$ $m^2$ are run as electric motors operated by the charging-current derived from the main source D, then their electro-motive force will assist the counter electro-motive force of the battery being charged when said machines are included in the circuit with the battery, and the available electro-motive force across the mains P N will be the greatest, while that across the mains P $N^3$ will be the least. In any case the armatures $m$ $m^2$ may be adjusted to have the same or different normal capacities or may be constructed to give different electro-motive forces under the same conditions.

When the machines $m$ $m^2$ are operated as generators driven by any suitable prime mover, the potential difference between the leads P N may be only that sufficient to force current through the battery at the beginning of the charge or when its counter electro-motive force is the lowest. In such case the switch S would be turned to connect the battery into circuit across the mains P N, and after the operation of charging had proceeded for a certain length of time, depending upon the conditions of the case, and the charging-current had become reduced, as shown by the instrument G, in consequence of the rise of the counter electro-motive force of the battery, the switch S would be turned to connect the battery to the main or lead $N^2$, thus bringing in the supplemental armature and raising the electro-motive force to a definite extent, so far as the particular series of cells controlled by said switch is concerned, thus bringing the charging-current up to the normal or proper amount. After the charging has gone on for a further certain length of time and the current becomes reduced by a further increase of counter electro-motive force of the battery, the assisting electro-motive forces for the main machines D would be further increased by turning the switch S to connect with the lead $N^3$, thus throwing another supplemental electro-motive-force generator $m^2$ into series with D and $m$. These adjustments could be carried to any desired extent, depending upon the number of supplemental machines provided.

It will be seen that the current flowing through each battery might be regulated individually and independently of the rest and that batteries having an unequal number of elements in series could be charged from the main source D. It will also be evident that the number of batteries that can be charged at once depends not upon the number of machines, but upon the total capacity of the main machine D and the number of switching appliances and other devices provided for connecting the batteries and changing the connections of each battery with the several mains.

I will now describe the action of the same apparatus when related so that each supplemental armature will operate as an electrodynamic machine or motor driven by the charging-current. The organization of devices and the connections remain the same, but the electro-motive force of the main source would be relatively higher. In this case the difference of potential across the mains $P\ N^3$ is that of the main machine less that of the two armatures $m\ m^2$ running in series, thus practically providing an electro-motive force which assists that of the battery in course of charging, and by varying which the charging-current may be regulated. Thus, if the battery be first charged by connecting it by means of switch S across mains $P\ N^3$, the increase of its counter electro-motive force would require after a time that its connections should be changed to the main $N^2$, thus cutting out the electro-motive force of $m^2$ and leaving that of $m$ alone to oppose the main charging-current.

The product of the counter-electro-motive force produced by the small machine or machines into the current passing through its armature represents in watts the energy abstracted from the circuit and made available for conversion into mechanical energy of motion. Hence, if the motors are belted or geared to the main dynamo D, or the prime mover supplying the power thereto, the mechanical energy resulting from the conversion will reduce by an amount equal to said energy the power required to drive the main dynamo, and practically but little energy will be lost in the making of the adjustments. If desired, the armatures might be placed on the same shaft with the armature of the main dynamo D.

As an illustration of the practical working, I will assume that the batteries A B C, &c., each consist of one hundred cells of the Planté type, requiring a difference of 2.1 volt per cell at the beginning and 2.35 at the end of the charge to maintain the proper charging-current. The potential difference employed must therefore vary between two hundred and ten and two hundred and thirty-five at the terminals of each series of cells. If both $m$ and $m^2$ were to be assumed as dynamo-electric generators, the electro-motive force of the dynamo D would be made by two hundred and ten volts, that of $m$ would be adjusted at about fifteen volts, and that of $m^2$ at about ten volts. By turning the switch S to connect with main N the cells would begin to charge from the potential with the dynamo D alone. After a time the switch would be turned so as to include the potential of machine $m$, making two hundred and ten plus fifteen equals two hundred and twenty-five volts. When the current has again fallen to a low value in consequence of rise in the counter electro-motive force for the cells, the switch would be moved so as to bring the battery under the combined potentials of D $m\ m^2$, giving two hundred and ten plus fifteen plus ten, equals two hundred and thirty-five volts. Assuming now that the machines $m\ m^2$ act as motors the dynamo D would in this case be adjusted to give two hundred and thirty-five volts. With all of the machines acting in series the resultant potential will be two hundred and thirty-five minus ten minus fifteen, equals two hundred and ten volts. After a time the battery would be transferred to main $N^2$, thus cutting out the ten volts counter of $m^2$, giving two hundred and twenty-five volts, and lastly the charging would be finished at the full potential by cutting out the armature $m$, leaving the full potential of D to act.

A preferred arrangement which gives a comparatively large number of variations of available potential and at the same time permits practically all of the energy to be consumed in the charging of the battery is illustrated in Fig. 3. In this case I have shown an arrangement wherein two or more supplemental machines or armatures are used as motor-armatures and two or more as dynamo-electric generators operating as supplemental electro-motive-force machines assisting that of the main charging-dynamo. The armatures acting as dynamo-electric generators are indicated at $m\ m^2$ and those operating as motors driven by the charging-current at $m^3\ m^4$. The two machines $m\ m^2$, operating in series, so that their electro-motive force can be added either singly or together to that of the main charging-machine, are connected, as in Fig. 1, to suitable mains or leads $N^2 N^3$, as in Fig. 1, and the machines $m^3 m^4$, whose electro-motive force either singly or together assists that of the batteries to be charged, have similar connections to mains or leads $N^4 N^5$. The several armatures may have obviously the same electro-motive-force capacity or be adjusted with relation to one another in the manner already described in connection with Fig. 1. Each switch S is provided with connections to the several charging-leads, as indicated, thus giving a range of potentials from that obtained by the potential of D minus $m^3 m^4$ together to that of D plus $m \ m^2$ together through five different stages.

The apparatus would be used as follows: By moving the switch S to make contact with switch-stud $g$ the particular battery controlled by said switch will receive the combined action of the main dynamo and the motors $m^3 m^4$, as will be seen by following the connections. The available potential being that of the main charging-dynamo less the combined counter-electro-motive force of the two armatures $m^3 m^4$. By moving the switch to $h$ the motor $m^4$ is cut out. At $i$ the batteries receive the action of the dynamo D alone. At $j$ the dynamo is supplemented by the machine $m$, whose electro-motive force assists that of D. At $k$ it is supplemented by both $m$ and $m^2$. The small machines are preferably connected together and to the prime mover as before, so that energy may be transferred to or from said prime mover, as the conditions of operation require. It will be clearly understood by reference to the drawings that any number of groups may be connected simultaneously to these charging-mains. It is only necessary that the armatures $m \ m^2 \ m^3$, &c., shall have sufficient current-carrying capacity to carry the current passing through them without undue heating or undue drop of potential. Each battery or group of batteries A B, &c., as will be readily seen, can be successively connected to the potentials that are appropriate for its rate or its phase of charge without interfering in the least with the other groups of cells. Moreover, the present arrangement renders it possible to charge batteries having different numbers of cells in series and consequent different electro-motive force.

Instead of belting the machines $m \ m^2$ individually to the dynamo or the prime mover I may belt only one of them and then belt the two machines to each other, as shown in Fig. 2.

In practice I sometimes combine the two supplemental machines into one by mounting them upon the same shaft, as indicated in Fig. 4. The advantage of thus combining the generator and the motor-armatures is that the power required to be taken from or returned to the prime mover is much less than by the other ways, being equal to the difference between the amounts of energy in action at each machine. In actual practical working, when a large number of batteries are at different phases of charge, the adjustments may be made such that practically very little power is transferred to or from the prime mover, the amounts absorbed and returned being nearly balanced, so as to nearly offset each other.

The armatures of the supplemental machines might be otherwise mechanically connected together without departing from my invention.

It will be obvious that the organization illustrated in Figs. 1 and 3 might be extended to include additional supplemental generators placed in series with those shown, connections being taken in the same manner from points between the added machines to the switching appliances.

What I claim as my invention is—

1. In an apparatus for charging storage-batteries, the combination, substantially as described, of two or more supplemental electro-motive-force generators connected in series with the main charging-dynamo and acting to assist either the charging or the counter electro-motive force of the battery, and switch devices having connections to intermediate points of the series of machines, whereby a different number of supplemental machines may be included in series with the battery, according to the state of charge or counter electro-motive force of the latter.

2. In an apparatus for charging storage-batteries, the combination, substantially as described, of a main charging dynamo or source adapted to supply energy of substantially constant potential, charging mains or leads connected thereto in series with the main machine, supplemental armatures connected in series with the main machine, supplemental leads extending from points in the circuit between said supplemental machines and the end of the series, and switch devices whereby a battery to be charged may be connected to any one of said leads at pleasure.

3. In an apparatus for charging storage-batteries, the combination, substantially as described, with the same main charging source, of a supplemental armature acting as a dynamo-electric generator, a second armature acting as a motor-armature, an electric switch, and connections whereby either one of said armatures may be connected at pleasure into the charging-circuit with the battery.

4. In an apparatus for charging storage-batteries, the combination of a main charging-dynamo, a supplemental dynamo-electric armature, a second supplemental motor-armature driven by the charging-current and mechanically connected to the driving-power of the first-named supplemental armature, and means for connecting either armature at pleasure into the circuit with the main charging-dynamo and the battery to be charged.

5. In an apparatus for charging storage-batteries, the combination, substantially as described, of a main charging-dynamo, two or more supplemental electro-motive-force generators acting to assist the charging electro-motive force and in series with the main charging-dynamo, two or more supplemental electro-motive-force generators acting to assist the counter electro-motive force of the battery charged and placed also in a series connection with the main charging-dynamo, charging-leads taken from the terminals and from the various intermediate points of each of said series circuits, and switching devices whereby a battery to be charged may be connected to any one of said leads at pleasure.

6. In an apparatus for charging storage-batteries, the combination, substantially as described, of a main charging-dynamo, two or more generator-armatures $m\ m^2$, acting as dynamo-electric generators and placed in series, two or more motor-armatures $m^3\ m^4$, run by the charging-current and in series with one another, mechanical connections between the motor-armatures and generator-armatures, and means whereby different numbers of motor or generator armatures may be connected into the charging-circuit of the battery in series with the main charging source.

7. The combination, with the main charging-dynamo adapted to supply a substantially constant potential, of supplemental generators in series with the main generating-machine, and a number of electric switches, each having connections to intermediate points of the series circuit, whereby different numbers of the said machines in series may be connected into each battery-charging circuit as the counter electro-motive force of the battery therein rises during the charge.

Signed at New York, in the county of New York and State of New York, this 22d day of April, A. D. 1891.

CYPRIEN O. MAILLOUX.

Witnesses:
WM. H. CAPEL,
T. F. CONREY.